United States Patent [19]
Tohma et al.

[11] Patent Number: 5,907,761
[45] Date of Patent: May 25, 1999

[54] BRAZING COMPOSITION, ALUMINUM MATERIAL PROVIDED WITH THE BRAZING COMPOSITION AND HEAT EXCHANGER

[75] Inventors: Ken Tohma; Hitoshi Saito; Hiroto Momosaki, all of Shizuoka-ken, Japan

[73] Assignee: Mitsubishi Aluminum Co., Ltd., Japan

[21] Appl. No.: 08/993,982

[22] Filed: Dec. 18, 1997

Related U.S. Application Data

[62] Division of application No. 08/406,498, Mar. 20, 1995, Pat. No. 5,820,698.

[30]     Foreign Application Priority Data

Mar. 28, 1994  [JP]  Japan .................................. 6-056913
Oct. 17, 1994  [JP]  Japan .................................. 6-250999

[51] Int. Cl.$^6$ ................................................. B32B 15/02
[52] U.S. Cl. ........................... 428/553; 428/560; 428/654; 148/24; 165/133
[58] Field of Search ................... 428/654, 553, 428/560; 148/24, 26; 165/133

[56]     References Cited

U.S. PATENT DOCUMENTS

| | | | |
|---|---|---|---|
| 4,785,092 | 11/1988 | Nanba et al. | 428/654 |
| 4,861,681 | 8/1989 | Asano et al. | 428/654 |
| 4,981,526 | 1/1991 | Kudo et al. | 148/24 |
| 5,330,090 | 7/1994 | Iwai | 148/24 |
| 5,529,639 | 6/1996 | Sato et al. | 148/26 |

FOREIGN PATENT DOCUMENTS 3-114659   5/1991   Japan .

*Primary Examiner*—George Wyszomierski
*Attorney, Agent, or Firm*—Ostrolenk, Faber, Gerb & Soffen, LLP

[57]     ABSTRACT

The present invention is a brazing composition for brazing a tube made of aluminum or aluminum alloy and a fin made of aluminum or aluminum alloy when manufacturing a heat exchanger such as evaporators, condensers, radiators, etc., comprising a powder of Al—Si—Zn alloy and binder, wherein the content of Zn in the powder of Al—Si—Zn alloy is in a range of 10 to 55 wt %.

20 Claims, 1 Drawing Sheet

BRAZING COMPOSITION, ALUMINUM MATERIAL PROVIDED WITH THE BRAZING COMPOSITION AND HEAT EXCHANGER

This is a division of application Ser. No. 08/406,498, filed Mar. 20, 1995, now U.S. Pat. No. 5,820,698.

BACKGROUND OF THE INVENTION

This invention relates to an art of heat exchangers for automobiles such as evaporators, condensers, radiators, etc.

Heat exchangers made of aluminum or an aluminum alloy material (hereinafter simply referred to as Al material) are manufactured through a steps of forming tubes or fins using brazing sheets clad with brazing materials, assembling them in a predetermined shape and brazing them.

However, it is difficult to manufacture brazing sheets and the yield is low, so that this method is wasteful. In addition, waste processing thereof is costly because brazing sheets are not suitable for recycling. Furthermore, it needs special techniques to manufacture tubes using brazing sheets. Also, brazing sheets are difficult to be processed to a fin shape and apt to damage jigs. In addition, brazing sheets are difficult to be processed so as to be thin, so that it is also difficult to produce small and light heat exchangers.

By the way, as a brazing material for brazing sheets, an Al—Si alloy is used (Japanese Patent Publication No.27037 (1983)).

In addition, as another brazing material, Al—Si—Zn alloy is known (Japanese Patent Publication No.27037 (1983), Japanese Patent Laid-Open No.151188 (1991)). The method of manufacturing brazing sheets by cladding a brazing material made of Al—Si—Zn alloy thereon, however, is difficult, so that this method is not used in practice.

Moreover, when using Al—Si alloy as a brazing material, it is proposed to provide a Zn film thereon in advance with a means such as flame spray coating, etc. for increasing the corrosion resistance. Namely, this implies that a fin and a tube on which an Zn film is provided are brazed with the Al—Si alloy clad on the fin. But, this method includes complicated steps such as the step of providing a Zn film, so that this method is not preferable.

Like this, in the prior art, when trying to keep a sufficient corrosion resistance, the manufacturing process becomes complicated and wasteful. Contrary to this, if trying to reduce manufacturing cost, the corrosion resistance goes down.

DISCLOSURE OF THE INVENTION

It is an object of the present invention to provide a brazing composition enabling one to manufacture a variety of products of which brazing cost is low and having excellent corrosion resistance.

It is another object of the present invention to provide a heat exchanger of which manufacturing cost is low, size is small and weight is light.

The object of the present invention is achieved by a brazing composition comprising a powder of Al—Si—Zn alloy (an alloy made of Al, Si and Zn as principal components) and a binder, wherein the content of Zn is in a proportion of 10 to 55 wt % of the Al—Si—Zn alloy.

Moreover, the object of the present invention is achieved by a brazing composition comprising a powder of Al—Si—Zn alloy, a binder and a solvent, wherein the content of Zn is in a proportion of 10 to 55 wt % of the Al—Si—Zn alloy.

Moreover, the object of the present invention is achieved by a brazing composition comprising a powder of Al—Si—Zn alloy, a binder, a flux and solvent, wherein the content of Zn is in a proportion of 10 to 55 wt % of the Al—Si—Zn alloy.

It is to be noted that it is preferable that the content of Zn of the Al—Si—Zn alloy is in a proportion of 10 to 40 wt %, more preferably 11 to 36 wt %, further more preferably 12 to 25 wt %.

Moreover, to effectively draw out the functions of the brazing material, it is preferable that the content of Si of the Al—Si—Zn alloy is in a proportion of 5 to 15 wt % (5 to 11 wt %, in particular).

Moreover, from a point of view of increasing corrosion resistance, it is preferable that the Al—Si—Zn alloy contains In. It is preferable that the content of In of the Al—Si—Zn alloy is in a proportion of 0.001 to 0.1 wt % (0.01 to 0.1 wt %, in particular).

Moreover, it is preferable that the Al—Si—Zn alloy contains Be of which content in the Al—Si—Zn alloy is in a proportion of 0.01 to 0.07 wt %, Bi of which content in the powder of Al—Si—Zn alloy is in a proportion of 0.02 to 0.20 wt %. Also, it is allowable that the alloy contains unavoidable impurities.

In particular, it is preferable that the Al—Si—Zn alloy contains In and Be, or In and Bi. The proportions are the same as described above.

Moreover, to effectively draw out the functions of the brazing material, it is preferable that an average particle diameter of the powder of Al—Si—Zn alloy is in a range of 10 to 200 $\mu$m (10 to 53 $\mu$m, in particular).

To provide the powder of Al—Si—Zn alloy of the present invention on the surfaces of tubes, header pipes or the like, a binder is used. For characteristics of this binder, the binder that tends to volatilize under a brazing temperature is preferable. In particular, acrylic resins and methacrylic resins of which average molecular weights are in a range of 1,000 to 100,000 are preferable. For example, polybutyl acrylates of which average molecular weight are in a range of 1,000 to 100,000 can be listed.

It is preferable that the blending ratio of the binder is in a proportion of 0.1 to 100 parts by weight to 100 parts by weight of the powder of Al—Si—Zn alloy, and in particular, a proportion of 5 to 20 parts by weight to the powder of Al—Si—Zn alloy.

To provide the brazing composition of the present invention on surfaces of Al materials, various coating means are adopted in general, for example, spraying method, flow coater method, roll coater method, brushing method or the like. Using these means, the brazing composition of the present invention is coated so as the thickness after dried is in a range of 5 to 200 $\mu$m. The range of the thickness is preferable from 10 to 150 $\mu$m, more preferably 10 to 60 $\mu$m. In particular, it is preferable that an amount of the coated powder of Al—Si—Zn alloy on a surface is in the range of 20 to 400 g/m$^2$, in particular, 40 to 150 g/m$^2$. For the solvents to be used when coating the powder of Al—Si—Zn alloy, aliphatic alcohols of which carbon number is in the range of 1 to 8 such as methanol, ethanol, propanol, butanol, isopropyl alcohol, pentanol and the like are listed. Among them, the most preferable solvent is isopropyl alcohol.

On the blending ratio of the binder and the solvent, it is preferable that the content of the solvent is in a proportion of 100 to 10,000 parts by weight to 100 parts by weight of the binder, in particular, a proportion of 500 to 2,000 parts by weight to 100 parts by weight of the binder.

For brazing works, fluoride fluxes such as $KF\text{-}AlF_3$ and $RbF\text{-}AlF_3$ are used. These fluxes may be added beforehand into the brazing composition of the present invention. Needless to say, it is possible to use other fluxes than the above. For the blending ratio of these fluxes, it is preferable that the content of flux is in a proportion of 3 to 50 parts by weight to 100 parts by weight of the powder of Al—Si—Zn alloy, in particular, a proportion of 10 to 30 parts by weight to 100 parts by weight of the powder of Al—Si—Zn alloy. It is preferable that a flux is added beforehand into the brazing composition, but it can be added at the brazing work.

Moreover, the object of the present invention is achieved by an Al material on which the above brazing composition is provided.

The Al material on which the brazing composition of the present invention is coated may be a component for a heat exchanger, that is, a fin. However it is preferable that the brazing composition of the present invention is coated on surfaces of a tube or a header pipe.

By assembling a fin and a tube (and a header pipe, optionally) on which surface a brazing composition is coated to a preset shape, and joining them by flux brazing under a vacuum atmosphere or an inert gas atmosphere, a heat exchanger is produced.

That is, the object of the present invention is achieved by a heat exchanger comprising a first heat exchanger component (a tube and/or a header pipe, for example) made of the Al material on which surface the above brazing composition is provided and a second heat exchanger component (a fin, for example), wherein the components are joined by flux brazing.

The reasons why the powder of Al—Si—Zn alloy is adopted by the present invention are described below.

(1) This method enables one to uniformly diffuse Zn which shows a sacrificial anode effect on the surface of a tube or a header pipe and increases corrosion resistance and pitting corrosion resistance of the tube or the header pipe.

In case of using an Al—Si alloy powder instead of the powder of Al—Si—Zn alloy, corrosion resistance and pitting corrosion resistance of the resultant tube or header pipe are inferior.

Also, in case of using a mixed powder of Al—Si alloy powder and the Zn powder instead of the powder of Al—Si—Zn alloy, corrosion resistance and pitting corrosion resistance of the resultant tube or header pipe are inferior.

(2) This method enables one to provide necessary quantity of brazing material to necessary places.

In this invention, an art such as cladding is not necessary, so that the manufacturing process becomes very simple. This reduces manufacturing cost. In particular, it becomes easy to provide a brazing material layer made of the Al—Si—Zn alloy that is difficult to clad.

(3) This method enables one to provide a various additives of powder (fluxes for brazing, for example) as necessary into a brazing material film as one.

Furthermore, as the present invention does not need to use brazing sheets for manufacturing a heat exchanger, the manufacturing cost goes down. Also, as there is no need to use brazing sheets for manufacturing fins, resultant fins can be thin, and a resultant heat exchanger is small and light.

EXAMPLES

Figure 1:
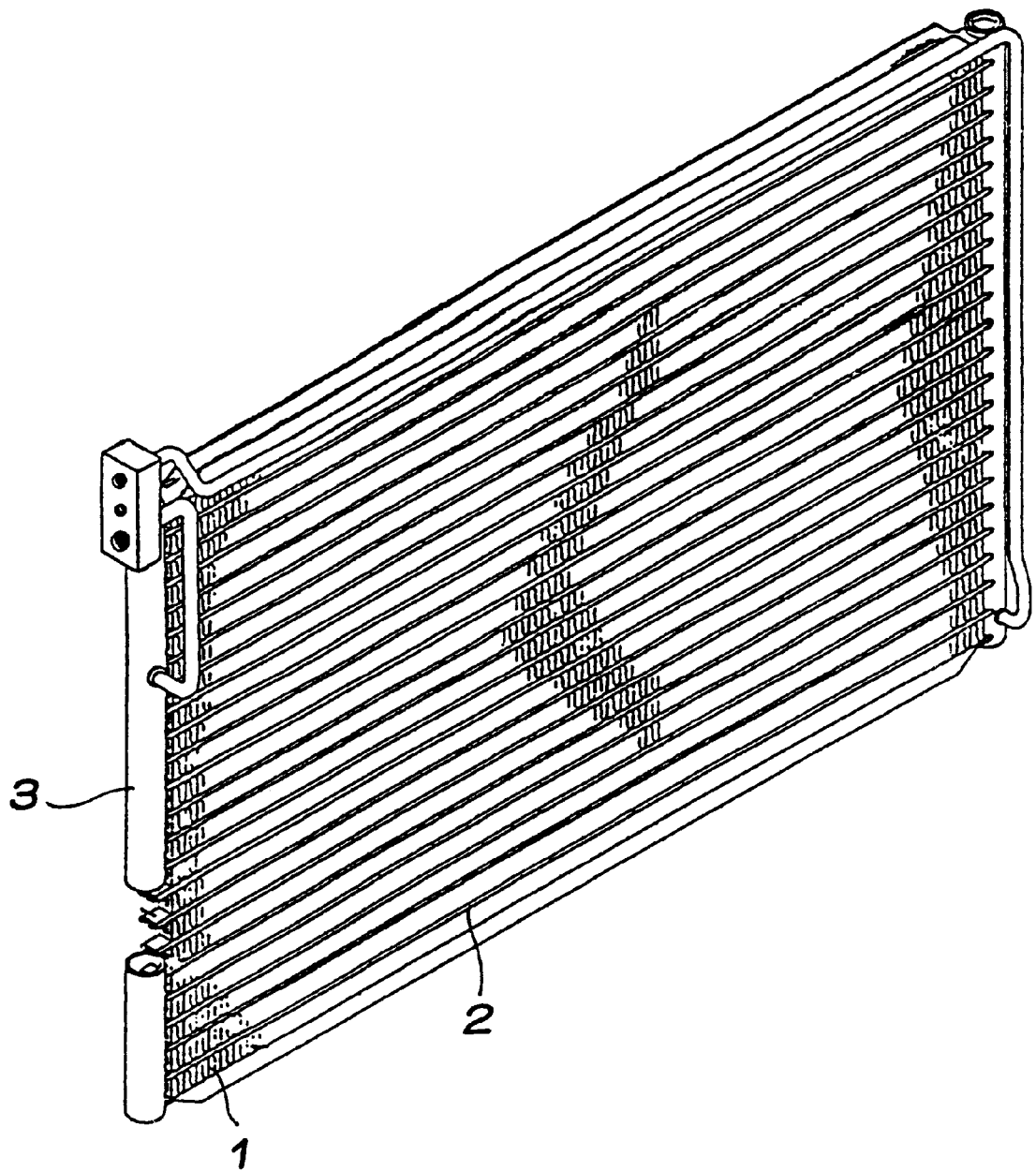
FIG. 1 is a figure showing an outline of a condenser brazed by the art of the present invention.

Next, concrete examples are explained.

Using atomization under a dried nitrogen atmosphere, spherical powders of which average particle size was in a range of 10 to 45 μm in each composition shown in the following Table-1 were produced.

TABLE 1

| | Proportion (wt %) | | | | | | Average particle diameter |
|---|---|---|---|---|---|---|---|
| | Si | Zn | In | Be | Bi | Al | (μm) |
| E-1 | 5.0 | 11.0 | 0.00 | 0.04 | 0.00 | rest | 10 |
| E-2 | 6.0 | 11.0 | 0.00 | 0.00 | 0.08 | rest | 30 |
| E-3 | 14.0 | 11.0 | 0.00 | 0.00 | 0.00 | rest | 30 |
| E-4 | 5.0 | 11.0 | 0.03 | 0.00 | 0.00 | rest | 20 |
| E-5 | 10.0 | 15.0 | 0.00 | 0.03 | 0.00 | rest | 10 |
| E-6 | 9.9 | 15.0 | 0.00 | 0.00 | 0.08 | rest | 30 |
| E-7 | 10.2 | 15.0 | 0.02 | 0.04 | 0.00 | rest | 30 |
| E-8 | 7.0 | 20.0 | 0.02 | 0.00 | 0.05 | rest | 30 |
| E-9 | 10.0 | 20.0 | 0.02 | 0.02 | 0.04 | rest | 30 |
| E-10 | 8.2 | 25.0 | 0.00 | 0.00 | 0.00 | rest | 20 |
| E-11 | 7.0 | 25.0 | 0.03 | 0.00 | 0.00 | rest | 20 |
| E-12 | 7.0 | 30.0 | 0.00 | 0.02 | 0.00 | rest | 40 |
| E-13 | 8.0 | 30.0 | 0.00 | 0.00 | 0.08 | rest | 30 |
| E-14 | 12.0 | 30.0 | 0.02 | 0.03 | 0.00 | rest | 30 |
| E-15 | 10.0 | 35.0 | 0.03 | 0.00 | 0.05 | rest | 20 |
| E-16 | 10.0 | 35.0 | 0.02 | 0.02 | 0.05 | rest | 20 |
| E-17 | 8.1 | 36.0 | 0.00 | 0.00 | 0.00 | rest | 45 |
| E-18 | 9.0 | 40.0 | 0.00 | 0.00 | 0.00 | rest | 30 |
| E-19 | 13.0 | 40.0 | 0.00 | 0.00 | 0.00 | rest | 30 |
| E-20 | 6.0 | 11.0 | 0.00 | 0.02 | 0.15 | rest | 20 |
| E-21 | 6.0 | 11.0 | 0.00 | 0.06 | 0.03 | rest | 20 |
| E-22 | 6.0 | 11.0 | 0.01 | 0.00 | 0.10 | rest | 20 |
| E-23 | 6.0 | 11.0 | 0.08 | 0.00 | 0.04 | rest | 20 |
| E-24 | 6.0 | 11.0 | 0.05 | 0.02 | 0.00 | rest | 20 |
| E-25 | 6.0 | 11.0 | 0.01 | 0.06 | 0.00 | rest | 20 |
| E-26 | 10.0 | 15.0 | 0.00 | 0.01 | 0.00 | rest | 20 |
| E-27 | 10.0 | 15.0 | 0.00 | 0.00 | 0.02 | rest | 20 |
| C-1 | 8.0 | 7.0 | 0.00 | 0.00 | 0.00 | rest | 30 |
| C-2 | 8.0 | 5.0 | 0.01 | 0.00 | 0.00 | rest | 30 |
| C-3 | 8.0 | 0.0 | 0.00 | 0.00 | 0.00 | rest | 30 |

Where, "E" means example of Embodiment and "C" means example for Comparison.

For each example, 100 parts by weight of the above alloy powder, 10 parts by weight of binder (polybutyl acrylate of average molecular weight 10,000), 50 parts by weight of solvent (isopropyl alcohol) and 15 parts by weight of flux ($KF\text{-}AlF_3$) were mixed and stirred. Thus, samples of brazing composition were produced.

Next, each of the above brazing composition was coated 30 μm in thickness (amount of alloy powder is 60 g/m$^2$) on a surface of extruded aluminum tube made of Al alloy of 2 mm in thickness, 20 mm in width and 500 mm in length. Also, each of the above brazing composition was coated 150 μm in thickness (amount of alloy powder is 300 g/m$^2$) on a part of a header pipe made of Al alloy in which the extruded aluminum tube would be inserted.

Assembling these extruded aluminum tubes, header pipes and fins, brazing were conducted by keeping them for 5 minutes at about 600° C. under a dried nitrogen atmosphere, and thus a condenser for automobile shown by FIG. 1 was obtained. In the FIGURE, number 1 is the fin, number 2 is the extruded aluminum tube and number 3 is the header pipe.

Results of examinations of the heat exchanger on brazing rate, corrosion resistance, pitting corrosion resistance are shown in the following Table-2.

TABLE 2

|      | Joining Rate | Corrosion Resistance | Pitting Corrosion Resistance |
|------|--------------|----------------------|------------------------------|
| E-1  | 99%          | ○                    | ○                            |
| E-2  | 99%          | ○                    | ○                            |
| E-3  | 97%          | ○                    | ○                            |
| E-4  | 97%          | Δ                    | ◎                            |
| E-5  | 99%          | ○                    | ○                            |
| E-6  | 99%          | ○                    | ○                            |
| E-7  | 99%          | Δ                    | ◎                            |
| E-8  | 99%          | Δ                    | ◎                            |
| E-9  | 100%         | Δ                    | ◎                            |
| E-10 | 97%          | ○                    | ○                            |
| E-11 | 97%          | Δ                    | ◎                            |
| E-12 | 99%          | ○                    | ○                            |
| E-13 | 99%          | ○                    | ○                            |
| E-14 | 99%          | Δ                    | ◎                            |
| E-15 | 99%          | Δ                    | ◎                            |
| E-16 | 100%         | Δ                    | ◎                            |
| E-17 | 97%          | ○                    | ○                            |
| E-18 | 97%          | ○                    | ○                            |
| E-19 | 97%          | ○                    | ○                            |
| E-20 | 100%         | ○                    | ○                            |
| E-21 | 100%         | ○                    | ○                            |
| E-22 | 99%          | Δ                    | ◎                            |
| E-23 | 99%          | Δ                    | ◎                            |
| E-24 | 99%          | Δ                    | ◎                            |
| E-25 | 99%          | Δ                    | ◎                            |
| E-26 | 99%          | ○                    | ○                            |
| E-27 | 99%          | ○                    | ○                            |
| C-1  | 97%          | Δ                    | X                            |
| C-2  | 97%          | Δ                    | X                            |
| C-3  | 97%          | X                    | X                            |
| C-4  | 93%          | X                    | X                            |
| C-5  | 93%          | Δ                    | ○                            |

Where, "E" shows example of Embodiment and "C" shows example for Comparison.
*In C-4, a mixed powder of 70 parts by weight of Al—Si alloy powder (Al: 92 wt %, Si: 8 wt %) of 30 μm in size and 30 parts by weight of Zn powder of 30 μm in size were used and processed similarly to E-1.
*In C-5, a brazing composition of Al—Si alloy powder (Al: 92 wt %, Si: 8 wt %) of 30 μm in size was coated on a surface of the extruded aluminum tube made of Al alloy on which Zn film was provided by flame spray coating, followed by flux brazing.
*○ in the column of "Corrosion Resistance" shows: "Only a little corrosion can be found on the tube".
*Δ shows "Light corrosion can be found on whole of the tube".
*X shows "Very heavy corrosion can be found on whole of the tube".
*◎ in the column of "Pitting Corrosion Resistance" shows: "Only the surface of the tube is pitting corroded".
*○ shows "A little pitting corrosion can be found on the tube".
*Δ shows "Heavy pitting corrosion can be found on the tube".
*X shows "Much penetrating pitting corrosion can be found on the tube".

Furthermore, similarly to the above embodiment, the above brazing composition of 30 μm (amount of alloy powder: 60 g/m²) was coated on a surface of the extruded aluminum tube made of Al winded in a coil-shape, followed by being cut into a predetermined length. Next, by assembling the extruded aluminum tube thus obtained, a header pipe and a fin, a condenser shown in FIG. 1 was obtained similarly to the above embodiment. This heat exchanger was examined on joining rate, corrosion resistance and pitting corrosion resistance. As a result, the same results as Table-2 were obtained.

These results show that the brazing composition of the present invention has excellent brazing property and superior corrosion resistance and pitting corrosion resistance.

It is to be noted that all brazing compositions containing Zn can not give superior corrosion resistance and pitting corrosion resistance. Namely, even if Zn is used, such a feature like this invention can not be obtained so far as the brazing composition is in a form of mixture of Al—Si alloy powder and Zn powder.

In addition, however, it is not enough to use Al—Si—Zn alloy, but the Zn content in the Al—Si—Zn alloy must be 10 to 55 wt %.

Furthermore, it is not enough to use Al—Si—Zn alloy of the above proportion, but the Al—Si—Zn alloy must be in a powder form.

Described as above, the present invention enables one to braze a tube made of aluminum and a fin made of aluminum alloy at a low temperature such as under 600° C., so that brazing work becomes easy and aluminum materials can avoid to be damaged by high temperature.

What is claimed is:

1. An aluminum or aluminum alloy material having a coating film layer thereon comprising an aluminum alloy powder and a binder wherein the aluminum alloy powder contains (a) 10 to 55 weight percent Zn, (b) 5 to 15 weight percent Si, (c) at least one of In in an amount of 0.001 to 0.1 weight percent and Be in an amount of 0.01 to 0.07 weight percent, and (d) Al constitutes the balance of the alloy (e) with the optional inclusion of 0.02 to 0.2 weight percent of Bi.

2. The aluminum or aluminum alloy material of claim 1 wherein the average particle diameter of said aluminum alloy powder is in the range of 10 to 200 μm.

3. The aluminum or aluminum alloy material of claim 1 wherein said binder is volatile at brazing temperature.

4. The aluminum or aluminum alloy material of claim 1 wherein said binder is (meth)acrylic resin having an average molecular weight in the range of 1.000 to 100,000.

5. The aluminum or aluminum alloy material of claim 1 wherein the binder is 0.1 to 100 parts by weight per 100 parts of said alloy powder.

6. The aluminum or aluminum or aluminum alloy material of claim 1 in which said coating film layer contains a flux in an amount of 3 to 50 parts by weight per 100 parts of alloy powder.

7. The aluminum or aluminum alloy material of claim 1 containing only one of In and Be.

8. The aluminum or aluminum alloy material of claim 1 containing both In and Be.

9. The aluminum or aluminum alloy material of claim 1 containing said Bi.

10. The aluminum or aluminum alloy material of claim 1 in which the content of Zn is 10 to 40 weight percent, the content of Si is 5 to 11 weight percent, the amount of binder is 5 to 20 parts per 100 parts alloy powder and the average particle diameter of the aluminum alloy powder is in the range of 10 to 53 μm.

11. A heat exchanger comprising a tube of aluminum or aluminum alloy, a coating film layer on a surface of said tube comprising an aluminum alloy powder and a binder; a fin of aluminum or aluminum alloy flux brazed to said tube, wherein said aluminum alloy powder contains (a) 10 to 55 weight percent Zn, (b) 5 to 15 weight percent Si, (c) at least one of 0.001 to 0.1 weight percent In and 0.01 to 0.7 weight percent Be, and (d) Al constitutes the balance of the alloy with the (e) optional inclusion of 0.02 to 0.2 weight percent of Bi.

12. The heat exchanger of claim 11 wherein the average particle diameter of said aluminum alloy powder is in the range of 10 to 200 μm.

13. The heat exchanger of claim 11 wherein said binder is volatile at brazing temperature.

14. The heat exchanger of claim 11 wherein said binder is (meth)acrylic resin having an average molecular weight in the range of 1000 to 100,000.

15. The heat exchanger of claim 11 wherein the binder content is 0.1 to 100 parts by weight per 100 parts of said alloy powder.

16. The heat exchanger of claim 11 in which said coating film layer contains a flux in an amount of 3 to 50 parts by weight per 100 parts of alloy powder.

17. The heat exchanger of claim 11 containing only one of In and Be.

18. The heat exchanger of claim 11 containing both In and Be.

19. The heat exchanger of claim containing Bi.

20. The heat exchanger of claim 11 in which the content of Zn is 10 to 40 weight percent, the content of Si is 5 to 11 weight percent, the amount of binder is 5 to 20 parts per 100 parts alloy powder and the average particle diameter of the aluminum alloy powder is in the range of 10 to 53 $\mu$m.

* * * * *